United States Patent
Ramachandra et al.

(10) Patent No.: US 11,823,671 B1
(45) Date of Patent: Nov. 21, 2023

(54) ARCHITECTURE FOR CONTEXT-AUGMENTED WORD EMBEDDING

(71) Applicant: Amazon Technologies, Inc., Seattle, WA (US)

(72) Inventors: Prathap Ramachandra, Kirkland, WA (US); Lan Ma, Seattle, WA (US); Liu Yang, Seattle, WA (US); Yi Qin, Seattle, WA (US); Kyung Jae Lee, Seattle, WA (US); Wenbo Yan, Seattle, WA (US); Charlotte Alizerine Dzialo, Seattle, WA (US); Darshan Ashok Fofadiya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 536 days.

(21) Appl. No.: 16/872,047

(22) Filed: May 11, 2020

(51) Int. Cl.
*G10L 15/22* (2006.01)
*G06F 40/279* (2020.01)

(52) U.S. Cl.
CPC ............ *G10L 15/22* (2013.01); *G06F 40/279* (2020.01)

(58) Field of Classification Search
CPC .............................. G10L 15/22; G06F 40/279
USPC ......................................................... 704/251
See application file for complete search history.

(56) References Cited

U.S. PATENT DOCUMENTS

| | | | |
|---|---|---|---|
| 8,553,065 B2 | 10/2013 | Gannu et al. | |
| 8,874,432 B2 | 10/2014 | Qi et al. | |
| 11,182,562 B2 | 11/2021 | Lee et al. | |
| 11,593,558 B2 | 2/2023 | Xin et al. | |
| 2021/0141815 A1* | 5/2021 | Kochura | G06F 40/166 |
| 2021/0233520 A1* | 7/2021 | Sar Shalom | G06F 40/20 |

* cited by examiner

*Primary Examiner* — Thierry L Pham
(74) *Attorney, Agent, or Firm* — Knobbe, Martens, Olson & Bear LLP (57) ABSTRACT

Features are disclosed for training and using a word embedding model configured to receive textual and context data associated with an utterance of a user. A word embedding model can be trained with text data and context data to account for context associated with the text data. The word embedding model can receive an input vector including text data and one or more sets of context data associated with the text data and perform word embedding based on the input vector. In some embodiments, the input vector can include an automatic speech recognition ("ASR") confidence score generated by an ASR model and one or more labels generated by an NLU model. In some embodiments, the input vector can include user information associated with the user.

20 Claims, 5 Drawing Sheets

ARCHITECTURE FOR CONTEXT-AUGMENTED WORD EMBEDDING

BACKGROUND

Natural language processing systems include various modules and components for receiving textual input from a user and determining what the user meant. In some implementations, a natural language processing system includes an automatic speech recognition ("ASR") module that receives audio data of an utterance of a user and generates text data corresponding to a transcription of the utterance. Natural language processing systems may also include a word embedding module that receives the text data and generates encoded representations of words such that words that have similar meanings also have similar representations. Natural language processing systems may also include a natural language understanding ("NLU") module that receives word embedding representations and determines the meaning of the text data. Natural language processing systems may also include an applications module that receives the natural language processing results and generates one or more commands for one or more applications.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to a natural language processing ("NLP") system that can receive textual input and determine the likely meaning of the input. Based on the likely meaning of the input, the NLP system can perform various operations, such as generating a command to be performed by an application. The NLP system utilizes a word embedding module to obtain, generate, or otherwise determine encoded representations of the natural language input, such as vectors of numerical values for individual words (or subsets of words) of the natural language input. The values of the word embeddings represent features of the words that the word embedding module has learned from analyzing a corpus of natural language training data. As a result, words in natural language input can be analyzed and manipulated mathematically by using word embeddings generated from the words.

In many cases, implementing a general word embedding module on input data may not provide satisfactory results in particular circumstances or for particular users (e.g., some input may include words or phrases not typically used by the general population, or used differently than by the general population). Further, certain inputs may serve different purposes in different sentences, and those differences may not have been learned by the word embedding module (e.g., a word may have a first meaning in a first sentence and a second meaning in a second sentence). For example, the word embedding module may be incapable of differentiating between uses of the same word that have different meanings, and the word embedding module may assume one meaning for each use of the same word regardless of the actual meaning. Conventional word embedding modules may therefore be inadequate in the aforementioned situations. A customized word embedding module trained on a subset of data associated with a particular context (e.g., a particular user or set of users) may provide better accuracy in some cases. However, such a customized word embedding module may not be practical due to the amount of data and computing resources that would be required to produce multiple context-specific modules to cover multiple subsets of data.

Some aspects of this disclosure relate to training and using a word embedding module configured to receive customized, personalized, or otherwise modified input for generating or otherwise obtaining a word embedding. The word embedding module described herein can provide improved accuracy for natural language processing by using context data that allows for further differentiation between different uses of the same word. A word embedding module that uses such context data is able to provide increased precision and recall without significantly impacting computation speeds provided by conventional word embedding modules. In some embodiments, the context data may be based on aspects of other NLP processes, such as NLU labels and ASR scores associated with the use of the word. The labels can provide classification information for a word and can indicate one or more classifications associated with the word based on usage, such as named entity classifications, content slots for actional user intents, or the like. The labels can be used to differentiate from multiple uses of the same word. For example, a first use of food may have an "item name" label and a second use of food may have an "other" label. The ASR scores can provide a confidence score for the ASR module's recognition of the word from source audio data. The ASR scores can be used to further to distinguish multiple uses of the same word. For example, if the ASR module consistently recognizes a particular word with low confidence and gives it one classification label, that output may correspond to a different word embedding than recognition of the same word with a higher confidence score and a different classification label. The labels and ASR scores may be used in combination with respective text data to generate input vectors for the word embedding module. The word embedding modules described herein may be more accurate than a general word embedding module when processing input from the user due to the addition of the context data (e.g., labels and ASR scores) which enable the word embedding module to differentiate from multiple uses of the same word.

Further aspects of the present disclosure relate to providing a word embedding module with non-ASR context data, such as user context data associated with the particular user or user's utterance. The user context data can provide user information corresponding to the user and the utterance, including user location, user demographics, user language, or other user information. The user context data can be used to further differentiate between multiple uses of the same word. For example, a first use of a particular word by a first user located in Canada may have a different meaning than a second use of the same word by a second user located in Mexico. The use of context data may allow the word embedding module to capture data not captured by traditional word embedding modules and allowing for a greater precision and recall by the word embedding module.

Additional aspects of the present disclosure relate to methods of generating input vectors for the word embedding module using context data. In some embodiments, the context data (e.g., labels, ASR scores, user context data, etc.) is appended to a portion of the text to generate an input vector. The input vector may be provided to the word embedding module for obtaining an encoded representation of the word in the relevant context. By combining the context data with the corresponding word or text portion to which the context data applies, the resulting input vector may be used with any number of conventional word embedding modelling methods to provide a greater accuracy and recall due to the inclusion of context data in addition to the text. In some embodiments, the word embedding module may be implemented using GloVe models, fastText models, Word2vec models, ELMo models, or other word embedding modelling methods.

Further aspects of the present disclosure relate to training a word embedding module based on a limited data domain that is optimized for particular input uses or user types. Specific users or inputs may be associated with a given service or system. For example, the users may be limited to users of a shopping service. The data domain that can be used to train a word embedding module may be limited to a shopping data domain. Therefore, the shopping data domain may not include data that does not correspond to shopping. The data domain may be further modified or limited to contain data adjusted for the given service or system. For example, the data domain may be adjusted to reflect a formality, grammar usage, slang use, or other particularity associated with a given service or system such as a shopping service. The particular data domain that will be used can be determined based on user data, user characteristics, service data, service characteristics, and the like. In addition, the data domain with which a user or a service is associated may change over time as usage history accumulates. When an NLP system is processing input of a particular type or from a particular user, it can determine which data domain the user or service is associated with and implement a corresponding word embedding module.

Various aspects of the disclosure will now be described with regard to certain examples and embodiments, which are intended to illustrate but not limit the disclosure. Although aspects of the embodiments described in the disclosure will focus, for the purpose of illustration, on a natural language processing system that receives spoken input in the form of user utterances and determines a user intent from that input, one skilled in the art will appreciate that the techniques disclosed herein may be applied to any number of software processes or applications performing named entity recognition. For example, a textual content item may be submitted by a user. As another example, the natural language processing system may be used to analyze publications and other network-accessible printed content, etc.

Figure 1:
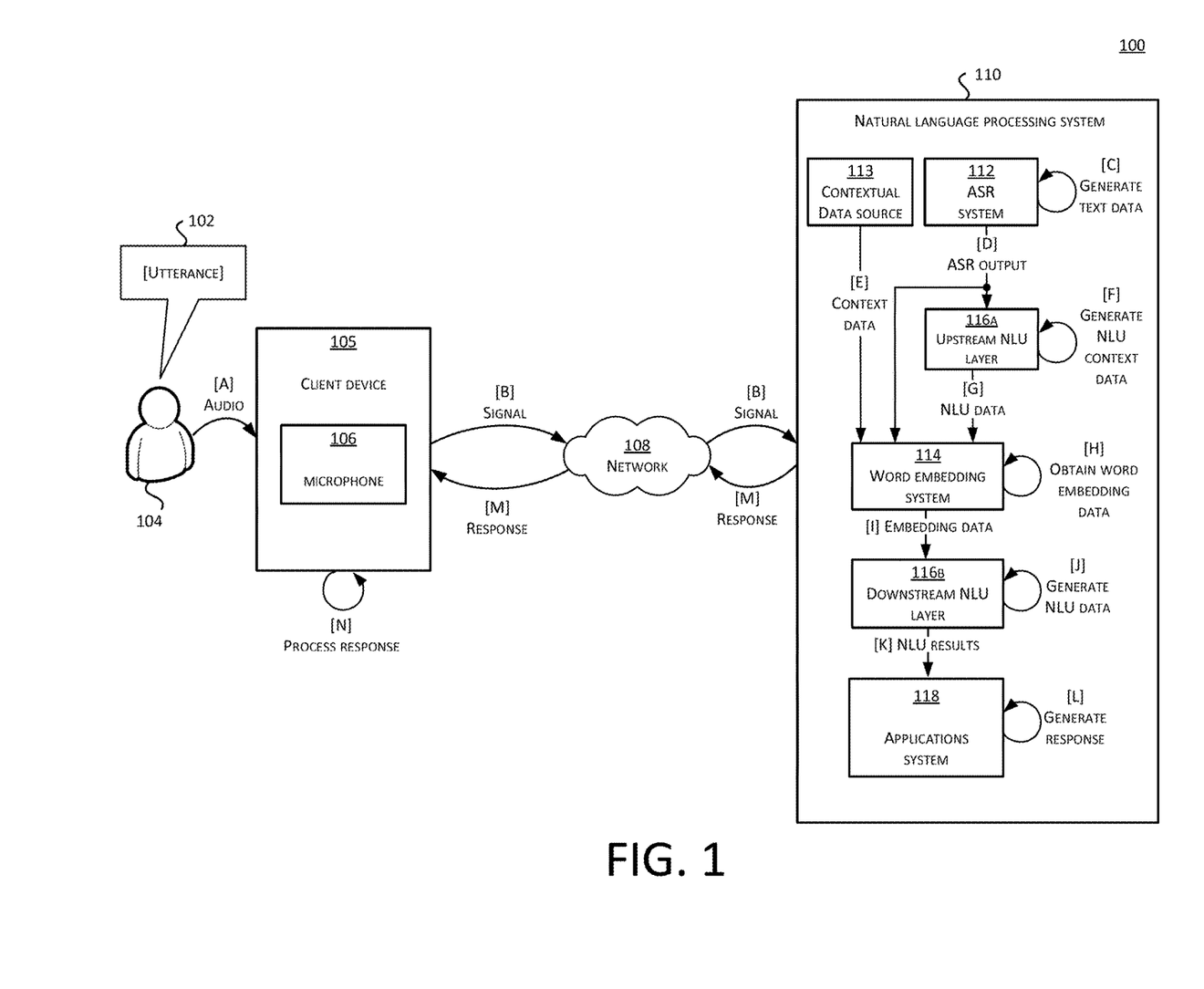
FIG. 1 depicts a schematic diagram of a natural language processing system, including an ASR module, a word embedding module, an NLU module, and an applications module in accordance with aspects of the present disclosure.

FIG. 1 illustrates an example environment 100 in which NLP system 110 may be implemented according to some embodiments. A user 104 may make an utterance 102, such as a spoken command, query, and the like. The utterance 102 may be in any language and any dialect. A client device 105 may capture audio of the utterance via a microphone 106 and generate signals for processing by the NLP system 110. For example, the microphone 106 may generate a signal with information regarding the captured audio of an utterance by the user 104, and the NLP system 110 may process the signal to generate a transcription of the utterance, generate a command in response to the utterance, and take some action in response to the command.

The microphone 106 may be integrated with, or in wired or wireless communication with, the NLP system 110. The microphone 106 may be integrated with, or in wired or wireless communication with, the client device 105 separate from the NLP system 110. For example, a user may make utterances captured by the microphone 106 of a client device, and the client device 105 may provide a microphone 106 signal (or information derived therefrom) to the NLP system 110. The client device 105 can correspond to a wide variety of electronic devices, such as a computing device that includes one or more processors and a memory which may contain software applications executed by the processors. Illustratively, the client device 105 may be a personal computing device, laptop computing device, handheld computing device, terminal computing device, mobile device (e.g., mobile phones or tablet computing devices), wearable device configured with network access and program execution capabilities (e.g., "smart eye-wear" or "smart watches"), wireless device, electronic reader, media player, home entertainment system, speaker configured with network access and program execution capabilities (e.g., "smart speakers"), gaming console, set-top box, television configured with network access and program execution capabilities (e.g., "smart TVs"), or some other electronic device or appliance.

In various examples, an audio signal (and metadata or other associated data) may be sent to the NLP system 110 over one or more networks 108. The one or more networks 108 may include any viable communication technology, such as wired and/or wireless modalities and/or technologies. The one or more networks 108 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. Any of the one or more networks 108 may include, and/or may or may not have access to and/or from, the internet.

The NLP system 110 may include various components for providing the features described herein. In some embodiments, the NLP system 110 may include an ASR system 112 to process audio signals received from one or more devices including the microphone 106. The ASR system 112 may receive the audio signals or other audio data and generate text data and/or other data representative of an utterance 102 of the user 104. The NLP system 110 may further include a contextual data source 113 to provide context data associated with the user or otherwise associated with the utterance. The NLP system 110 may further include an NLU system 116A, 116B configured as a multi-layer system or as two independent subsystems of the NLP system 110. The NLU system 116A, 116B may include an upstream NLU layer 116A and a downstream NLU layer 116B. The upstream NLU layer 116A may receive the text data from the ASR system 112 and generate NLU context data associated with the text data, such as classification labels for words or word groupings in the text data. The downstream NLU layer 116B may generate NLU results based on the results of the ASR system 112, upstream NLU layer 116A, and/or one or more other downstream components, as described below.

The NLP system 110 may further include a word embedding system 114 to obtain word embedding data based at least in part on one or more of the text data, ASR context data, NLU context data, and other context data. The word embedding data represents the text data or portions thereof in view of the context represented by the context data. The word embedding system 114 may process the text data and any provided context data associated with the text data to generate a vector representation of each portion (e.g., word or word grouping) of the text data. The downstream NLU layer 116B may process the word embedding results and generate a semantic representation of the utterance 102 of the user 104. The NLP system 110 may also include an applications system 118 that includes or manages one or more applications to respond or otherwise act on the utterance 102 of the user 104, such as by providing requested content, performing requested operations, and the like. The applications system 118 may respond to an utterance 102 of the user 104 by sending the response, via the network 108, to the client device 105 for performing one or more requested operations associated with the response. In other embodiments, the applications system 118 may operate an application either directly, via the network 108, or via another network. The example subsystems and components of the NLP system 110 shown in FIG. 1 are illustrative only, and are not intended to be limiting. In some embodiments, an NLP system 110 may have fewer, additional, and/or alternative components and data stores.

The NLP system 110 may be implemented on one or more physical server computing devices that provide computing services and resources to end-user devices, such as the client device 105. In some embodiments, the NLP system 110 (or individual components thereof) may be implemented on one or more host devices, such as blade servers, midrange computing devices, mainframe computers, desktop computers, or any other computing device configured to provide computing services and resources. For example, a single host device may execute one or more ASR systems 112, word embedding systems 114, NLU system 116A, 116B, applications system 118, some combination thereof, etc. The NLP system 110 may include any number of such hosts.

In some embodiments, the features and services provided by the NLP system 110 may be implemented as web services consumable via one or more communication networks. In further embodiments, the NLP system 110 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

At [A], the user 104 can produce the utterance 102. The utterance 102 may be in response to a query, question, prompt, etc. from the client device 105 or the NLP system 110. The utterance 102 may be audio data or audio signals produced by the user 104.

At [B], the microphone 106 can receive audio from the user 104 representing the utterance 102. The microphone 106 can send the audio as an audio signal to the NLP system 110 via the network 108. The audio signal may be a recording or substantially real-time stream of the utterance 102 of the user 104 or the audio signal may include data derived from a recording or substantially real-time stream of the utterance 102 of the user 104.

At [C], the ASR system 112 can generate text data using the audio signal received at [B]. Illustratively, the text data may include one or more transcripts or other text data representative of words in the utterance 102. In some examples, the ASR system 112 may generate ASR confidence score data representing the likelihood that a particular word or words of the text data matches those spoken in the utterance 102. For example, the ASR system 112 may determine a score representing a confidence or likelihood that a first portion of the text data matches a corresponding first portion of the utterance 102 (e.g., using a language or grammar model). Thus, each potential textual interpretation of the utterance 102 may be associated with an ASR confidence score. The ASR system may provide the data as an ASR output to the word embedding system 114 and the upstream NLU layer 116A at [D].

At [E], context data (e.g., metadata or other data) corresponding to the text data generated by the ASR system 112 may be provided to the word embedding system 114 in order to provide context concerning the text data. Although FIG. 2 labels only the output of contextual data source 113 as context data, in some embodiments context data may be generated by the ASR system 112, the upstream NLU layer 116A, and/or a context data source 113, as described in greater detail herein. The ASR system 112, the upstream NLU layer 116A, and the context data source 113 may each provide different context data corresponding to the text data. For example, the context data of the ASR system 112 may be a confidence score generated for a particular word during ASR processing, the context data of the context data source 113 may be a geographic location, and the context data of the upstream NLU layer 116A may be a label generated for a particular word. The context data source 113 may be either internal or external to the NLP system 110. The context data may correspond to all or a portion of the text data. Further, the context data may include information corresponding to the user 104. For example, the user information may include geographic location of a user or the client device 105 from which audio data of the user's utterance was received, demographic information of the user, occupation of the user, a personal interest of the user, or other information associated with a user or a system/service corresponding to the user.

At [F], the upstream NLU layer 116A can generate NLU context data corresponding to the text data generated by the ASR system. Illustratively, the NLU context data may include one or more labels or categories generated for a portion or word of the text data by the NLU system 116A, 116B. In some examples, the upstream NLU layer 116A may generate a label corresponding to a likely classification, such as named entity classification of a particular word or words of the text data. Each portion of the text data (or a subset of portions) may be associated with its own label. The upstream NLU layer 116A may provide the NLU contextual data as NLU data to the word embedding system 114 at [G].

At [H], the word embedding system 114 can obtain word embedding data using the text data, the context data, and the NLU data received at [D], [E], and [G] respectively. Illustratively, the context data may be appended to the text data to create an input vector before being provided to the word embedding system 114. For example, for a given text data "Potato" and given NLU context data "fooditem" label and given ASR context data "high" ASR confidence score, the word embedding system 114 may receive an input vector "<Potato, fooditem, high>". In some implementations, obtaining the word embedding data may include generating or otherwise determining one or more word embedding values for an input vector. The context data and text data may be appended, concatenated, or combined via other methods to combine the multiple datasets and may be combined into a form other than an input vector. For example, the text data and context data may be received by the word embedding system 114 as different datasets. The word embedding system 114 may obtain word embedding data for each input vector. Each item of word embedding data comprises a word embedding representing a corresponding word in a numerical manner. Example processes for using context data, and concatenating or otherwise including the context data with the text data while performing NLP, are described in greater detail below. At [I], the word embedding system 114 provides the word embedding data to the downstream NLU layer 116B.

At [J], the downstream NLU layer 116B may generate NLU results data, such as a semantic representation of the utterance 102, using the obtained word embedding results. The downstream NLU layer 116B may generate the semantic representation by processing the word embedding results. The downstream NLU layer 116B may generate the semantic representation based on the plurality of word embedding outputs associated with one or more words of the text data, and other data such as the ASR results. For example, the downstream NLU layer 116B may receive a word embedding output indicating a numerical representation of the word "potato" and the downstream NLU layer 116B may generate a semantic representation of the user's utterance that includes "potato" as a portion of the user's intent, such as a content slot of a "purchase" intent. At [K], the downstream NLU layer 116B may provide the semantic representation to the applications system 118.

At [L], the applications system 118 can generate a response to the utterance 102 of the user 104 based on the semantic representation of the text data. The applications system 118 may select and initiate an appropriate application to generate a response or otherwise perform an action based on the semantic representation. For example, the applications system 118 may include a collection of specialized applications, each directed to a specific domain of intents, and configured to respond to utterances determined to include intents in the corresponding domains. For example, the applications system 118 may include application in each of the music domain (e.g., music streaming services, music purchase services, etc.), video domain (e.g., video streaming services, video purchase services, etc.), household organization domain (e.g., calendars, reminders, timers, alarms, etc.), and other types of domains.

At [M], the NLP system 110 can transmit a response to the client device 105 based on the response generated by the applications system 118. The NLP system 110 can transmit the response to the client device 105 via the network 108. The client device 105 may process the response at [N] and cause a response to be presented to the utterance 102.

Figure 2:
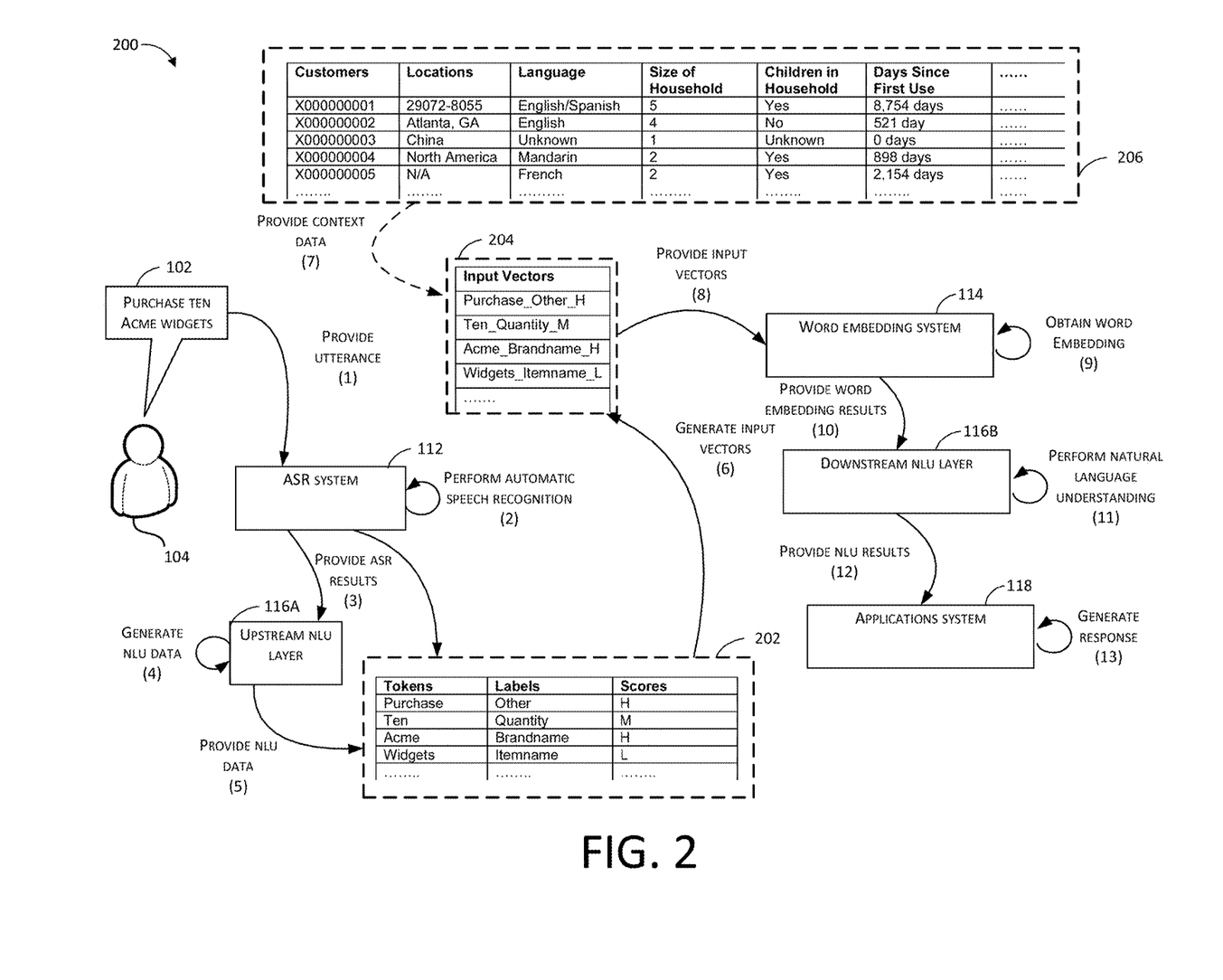
FIG. 2 depicts an example workflow for a natural language processing system generating a command in response to a user utterance according to some embodiments.

FIG. 2 depicts an example workflow 200 for an NLP system generating a command in response to audio of a user in accordance with aspects of the present disclosure. The NLP system may run automatically or the NLP system may be initiated based on a command prompt by a user. In one embodiment, users of the NLP system may specify context data to be used for operation of the NLP system. For example, users may specify user context data such as a language, location, size of household, etc. that are provided to the NLP system for use as context data. In other embodiments, the NLP system may determine context data associated with a given user based on other inputs provided by the user. For example, the NLP system may determine a language of the user based on performing speech recognition on an utterance of the user.

As shown in FIG. 2 at (1), the user 104 produces an utterance 102 corresponding to a given command, query, or another request. The utterance 102 may be received at a microphone or other application and subsequently provided to an ASR system 112 as audio data or an audio signal. In other embodiments, the utterance 102 may be provided directly to the ASR system 112. In the example of FIG. 2, the utterance 102 is "Purchase ten Acme widgets" and the corresponding audio representation is provided to the ASR system 112. In the utterance 102, "Acme" may correspond to a given brand name.

At (2), the ASR system 112 processes the utterance provided by the user 104 to determine a textual representation of the audio data corresponding to the utterance 102. The ASR system 112 may generate one or more textual representations or tokens for each portion of the utterance. The tokens may correspond to a word or words of the utterance 102. For example, for the phrase "Buy Coca-Cola and Sprite," the phrase may be divided into four tokens: "Buy," "Coca-Cola," "and," "Sprite." The ASR system 112 may further generate one or more context data sets associated with each token and/or with the utterance 102 as a whole. The ASR system 112 may generate a scores context dataset corresponding to a confidence score associated with a given token. The confidence score may be based at least in part on the generating the one or more textual representations and may vary from a low score to a high score. The scores context dataset may represent the confidence score itself, or a grouping or "bin" of confidence scores—within the range of possible confidence scores—that includes the confidence score. For example, the entire range of possible confidence scores (or some subset thereof, such as the portion of the range that includes a threshold percentage of observed scores) may be separated into n bins, where n is an integer, such that similar scores are assigned to the same bin.

At (3), the ASR system 112 generates and provides the ASR results to the upstream NLU layer 116A. At (4), the upstream NLU layer 116A processes the ASR results proved by the ASR system 112 to determine NLU contextual data associated with ASR results. The upstream NLU layer 116A may generate, recognize, or assign one or more labels to each token or token group of the ASR results (or some subset thereof). The labels may correspond to one or more classifications, groupings, or other labels associated with the token, such as named entity classifications. In some embodiments, one or more tokens may correspond to multiple labels. For example, a given token may correspond to a label "item type" and "food."

At (5), the ASR results and the NLU contextual data may be provided as a data set 202 including a list of tokens and one or more lists of corresponding context data sets. In the embodiment of FIG. 2, the data set 202 includes the following tokens: "Purchase," "Ten," "Acme," "Widgets" generated from the utterance 102. Further, the data set 202 includes a context data set: "Labels" generated by the upstream NLU layer 116A and a context data set: "Scores" generated by the ASR system 112. In the example of FIG. 2, the context data set "label" corresponds to an NLU category of a given token and the context data set "score" corresponds to an ASR confidence score bin to which the ASR confidence score for a given token belongs. The ASR confidence score bins range from L (i.e., a low confidence score) to M (i.e., a medium confidence score) to H (i.e., a high confidence score). The token "Purchase" corresponds to a label "other" and a score "H." The token "Ten" corresponds to a label "quantity" and a score "M." The token "Acme" corresponds to a label "Brandname" and a score "H." The token "Widgets" corresponds to a label "Itemname" and a score "L." It will be understood that the data set 202 may include any number of tokens and any number of context datasets.

At (6), the ASR system 112 generates input vectors 204 based on the data set 202. The input vectors 204 may be in a collection of data in vector format. In the embodiment of FIG. 2, the data set 202 is concatenated together to form the input vectors 204 as each of the context data sets is appended to the corresponding token. The token "Purchase" is concatenated with its context data sets to form the input vector "Purchase_Other_H." The token "Ten" is concatenated with its context data sets to form the input vector "Ten_Quantity_M." The token "Acme" is concatenated with its context data sets to form the input vector "Acme_Brandname_H." The token "Widgets" is concatenated with its context data sets to form the input vector "Widgets_Itemname_L." In other embodiments, the individual portions of each input vector may be separated by commas, periods, spaces, other symbols, or may not be separated. For example, the token "Ten" may form the input vector "TenQuantityM" or "Ten Quantity M." In other embodiments, generating the input vectors may be performed by another system such as a system located externally to the NLP system 110 and/or the ASR system 112. The input vectors 204 may include any number of input vectors and the input vectors 204 may be any length.

At (7), the word embedding system 114 may, in some embodiments, receive context data that is separate from the context data produced by the ASR system 112 and the upstream NLU layer 116A. The separate context data set 206 may be received and used instead of or in addition to the context data produced by the ASR system 112 and/or the upstream NLU layer 116A. The context data set 206 may be used in order to capture further context not included in the data set 202. For example, the context data set 206 may be different from context data included with or otherwise associated with the data set 202 received at (3) and (5). The context data set 206 and the data set 202 may be received and concatenated into context-augmented input vectors 204. In other examples, one of the context data set 206 and the data set 202 may be concatenated with a given token into a context-augmented input vector. One or more components of the NLP system may concatenate the data set 202 and/or the context data set 206 to generate the context-augmented input vectors 204. For example, the word embedding system 114 may generate the context-augmented input vectors.

The one or more components of the NLP system may receive the context data set 206 from user computing devices or other devices associated with the customer. The context data set 206 may correspond to each portion of the utterance 102. In other embodiments, a first portion of the context data set 206 may correspond to a first portion of the utterance 102 and may not correspond to a second portion of the utterance 102. One or more components of the NLP system may be configured to store data associated with a given user of the NLP system. In other embodiments, user data may be stored and maintained by a service or data repository that is separate from and remotely accessible by the NLP system or the word embedding system 114 (such as a data store maintained in association with a retail server that processes and stores users' interactions with a retail service), and the one or more components of the NLP system may obtain historical and/or current user data individually or in bulk from such a data source.

Illustratively, the context data set 206 may be user context data corresponding to user attributes such as annual spend, most frequently visited website, favorite television show, or other data associated with a user's interactions with a given service or system. The context data set 206 may be provided as a plurality of field-value pairs for each user of a plurality of users with a field corresponding to a given attribute of a user and the value corresponding to a value associated with the given attribute. For example, a given field can be "Favorite TV Show" and the corresponding value for a given user can be "Sesame Street." A given field may correspond to multiple users or may be unique to a particular user. The one or more components of the NLP system may receive and/or store data associated with one or more users of the NLP system. A given user of the NLP system may be associated with a particular identification that may be used to associate a given user with corresponding data. For example, a given user of the NLP system may be associated with one or more customer IDs.

In the embodiment of FIG. 2, the one or more components of the NLP system stores data fields for "Users," "Locations," "Language," "Size of Household," "Children in Household," "Days Since First Use." Each user of the NLP system may be associated with a given value for each of the above data fields and each user may be associated with a plurality of field-value pairs. In the example of FIG. 2, User X000000001 is associated with the following field-value pairs "Locations:29072-8055," "Language:English/Spanish," "Size of Household:5," "Children in Household:Yes," "Days Since First Use:8,754 Days." User X000000002 is associated with the following field-value pairs "Locations: Atlanta, Ga.," "Language:English," "Size of Household:4," "Children in Household:No," "Days Since First Use:521 Days." User X000000003 is associated with the following field-value pairs "Locations:China," "Language:Unknown," "Size of Household:1," "Children in Household:Unknown," "Days Since First Use:0 Days." User X000000004 is associated with the following field-value pairs "Locations:North America," "Language:Mandarin," "Size of Household:2," "Children in Household:Yes," "Days Since First Use:898 Days." User X000000005 is associated with the following field-value pairs "Locations:N/A," "Language:French," "Size of Household:2," "Children in Household:Yes," "Days Since First Use:2,154 Day." It will be understood that each user may be associated with any number of data fields and the NLP system may receive and/or store data corresponding to any number of users.

Some users of the word embedding system may not have a value for a given field-value pair provided to the NLP system. A given user may include a designation that a value is not included for a field-value pair corresponding to that user. For example, for a field-value pair, a user may include a designation such as "0," "N/A," "Unknown," "Not Available," or other designations that a value for the field-value pair for the user is not available, known, or otherwise determined. In the example of FIG. 2, customer X000000003 has a value of "Unknown" for the field "Language," a value of "Unknown" for the field "Children in Household," and a value of "0 days" for the field "Days Since First Use." Further, customer X000000005 has a value of "N/A" for the field "Locations." In other embodiments, other designations may be used to illustrate an unknown value of a field-value pair.

At (8), the context-augmented input vectors 204 are provided to the word embedding system 114 to obtain word embedding data.

At (9), the word embedding system 114 obtains word embedding data based on the input vectors 204. The word embedding system 114 may be configured to obtain previously-trained word embedding values based on the input vectors 204, including ASR context data, NLU context data, and/or other context data. For each of the input vectors, the word embedding system 114 may obtain or otherwise determine a value representing a given word or token associated with the input vector, and the value may further include, represent, or otherwise be associated with one or more features of the token learned by the word embedding system 114 during training.

In the example of FIG. 2, the word embedding system 114 receives at least four different input vectors corresponding to the utterance 102 (e.g., "Purchase_Other_H," "Ten_Quantity_M," "Acme_Brandname_H," "Widgets_Itemname_L"). In other embodiments, the input vectors 204 may include data from the context data set 206. The word embedding system 114 obtains a value for an input vector based on token in the input vector and also the ASR context data, the NLU context data and/or the context data set 206. For example, for the word "Widgets" and context-augmented input vector "Widgets_Itemname_L," the word embedding system 114 may be trained to determine a particular numerical representation each time that specific context-augmented input vector is observed (until the word embedding system 114 is re-retrained). If a different context-augmented input vector for the token "Widgets" is received, such as "Widgets_Other_L," the word embedding system may be trained to determine a different numerical representation. The Thus the word embedding system 114 may, based on the context data of the input vectors 204, effectively produce adjusted numerical values for a certain word as compared to a word embedding system based solely on text data.

At (10), the word embedding system 114 provides the word embedding results obtained in (9) to the downstream NLU layer 116B.

At (11), the downstream NLU layer 116B may generate NLU results data, such as a semantic representation of the utterance 102, using the obtained word embedding results. The downstream NLU layer 116B may generate the semantic representation by processing the word embedding results and other data, such as the ASR results, using a model configured to accept a plurality of word embedding values corresponding to each word of an utterance. In the present example, the downstream NLU layer 116B may determine that the utterance "Purchase Ten Acme widgets" may reasonably be interpreted as a command to purchase ten widgets associated with the brand name, Acme. At (12), the downstream NLU layer 116B may send the NLU results to the application system 118.

At (13), the applications system 118 may generate a response to the utterance 102 based on the NLU results data. The applications system 118 can select and initiate an appropriate application to generate a response or otherwise perform an action based on the NLU results. For example, the applications system 118 may include a collection of specialized applications, each directed to a specific response and configured to respond to a specific utterance or group of utterances.

Figure 3:
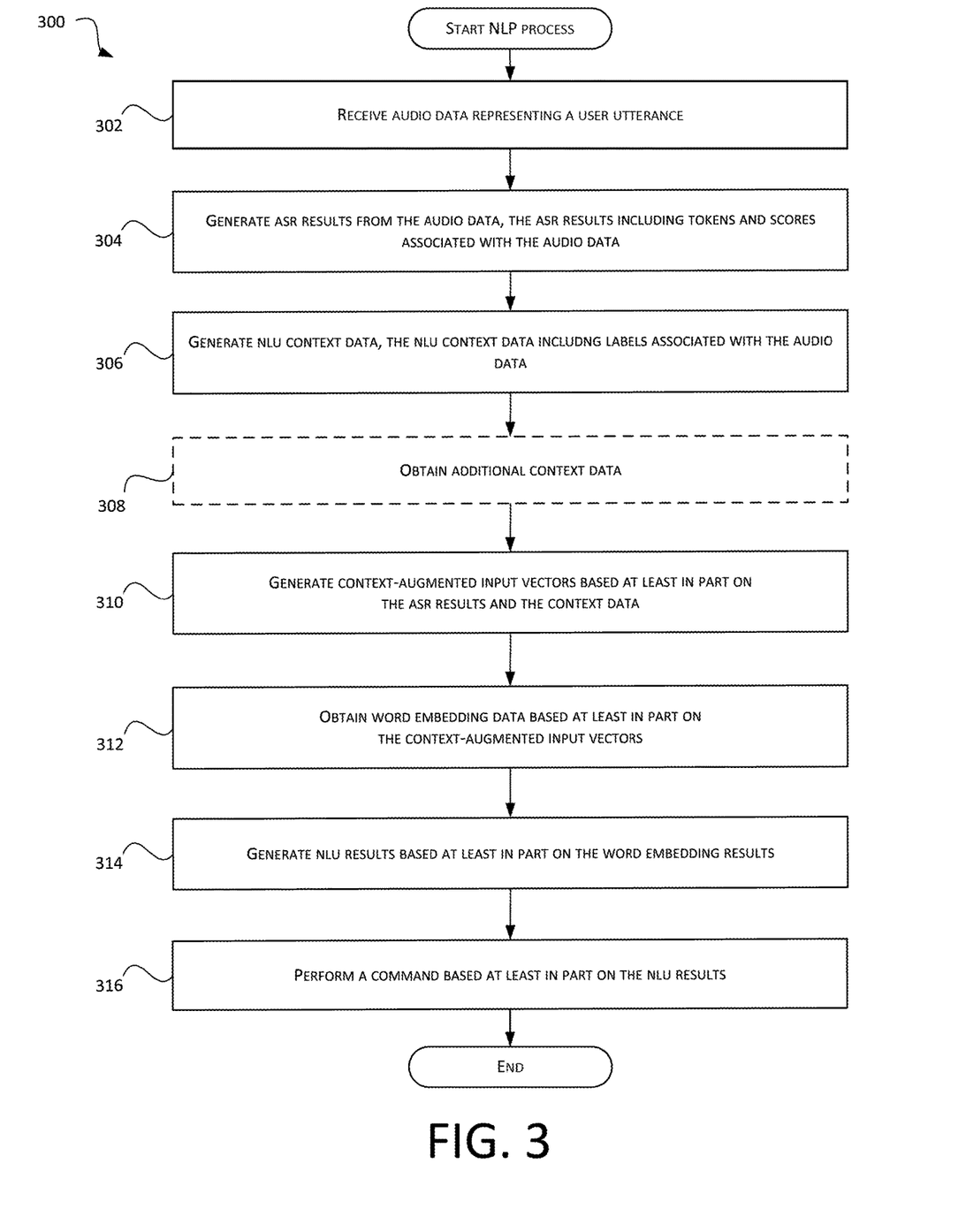
FIG. 3 is a flowchart of an example routine for implementing a natural language processing system using context-augmented word embedding input according to some embodiments.

FIG. 3 describes an illustrative process 300 for implementing an NLP system. The process 300 includes obtaining a word embedding module trained to receive both textual and context data for NLP. By using such a word embedding module, the NLP results may be more accurate for words that may be associated with multiple meanings or interpretations. Further, the NLP results may be more accurate for words specific to a user, set of users, dialect, language, region, category, service, system, etc.

The process 300 begins at block 302. The process 300 may begin automatically upon initiation of an NLP session. For example, the process 300 may begin upon receiving a wake word such as "Hey" or "Computer." The process 300 may be embodied in a set of executable program instructions stored on a computer-readable medium, such as one or more disk drives, of a computing system of the NLP system. When the process 300 is initiated, the executable program instructions can be loaded into memory, such as RAM, and executed by one or more processors of the computing system. Upon initiation of the NLP session, at block 302, a device, such as a microphone or other computing device, may record an utterance by a user. The utterance may correspond to one or more words, sounds, or other audio data from one or more users. The device may process the utterance by the user and generate a corresponding audio signal. The audio signal may then be provided to the NLP system for further processing and generating a response to the utterance.

At block 304, the audio signals may be provided to an ASR system of the NLP system for automatic speech recognition. The ASR system can process the audio signals to generate text data (e.g., one or more likely textual representations or transcripts) of the utterance. The ASR system may generate a sequence of words, where each word corresponds to a textual representation of a portion of the audio signal and corresponding utterance. The ASR system may further generate one or more confidence scores for each word or word grouping of the textual representation generated by the ASR system. The one or more confidence scores may correspond to a probability or likelihood that a portion of the textual representation generated by the ASR system accurately corresponds to a given portion of the utterance. The one or more confidence scores may correspond to a numerical and/or written designation of the confidence associated with a portion of the textual representation.

At block 306, NLU context data may be generated by the NLU system for a given portion of the audio signal based on the ASR results. The NLU context data may be one or more labels for various word groupings of the textual representation. The labels may correspond to a category, designation, grouping, classification, or other context data associated with a given portion of the audio signal. For example, the labels may represent classifications such as item names, brand names, quantity, personal names, or other classifications.

At block 308, additional context data may, in some embodiments, be provided to the NLP system in order to further provide context data associated with the utterance. Such additional context data may be referred to as user context data. The user context data may be obtained from the user associated with the utterance. The context data associated with the user may be used alone, or with the context data from the ASR system and/or the NLU system, to provide context of the utterance of the user. The context data associated with the user may include information corresponding to the user and/or the user's interactions with a given service or system. In some embodiments, block 308 may not be included in the process 300 and the NLP system may not receive additional context data for natural language processing. In such embodiments, the NLP system may perform natural language processing based on the context data generated by the ASR system at block 304 and/or the context data generated by the NLU system at block 306.

At block 310, one or more context-augmented input vectors may be produced based on the ASR results in order to be provided to a word embedding system. The one or more context-augmented input vectors may include at least a word or word grouping and one or more items of context data, such as one or more labels, and one or more confidence scores. In some embodiments, the one or more input vectors may be further based on user context data. One or more field-value pairs from the user context data may be added to the one or more input vectors. For example, the one or more input vectors may include a word grouping, a label, a confidence score, a location, a language, and a household size. The one or more input vectors may include any number of field-value pairs from the user context data. The one or more input vectors may include the word or word grouping in a first data element and context data from the ASR results and/or the user in other data elements. In other embodiments, the fields or portions of the one or more input vectors may be ordered in any manner. In other embodiments, the one or more inputs vectors may not include information corresponding to the context data of the user.

At block 312, a word embedding system obtains word embedding values for a word or token based on the one or more input vectors and the context data associated with the respective input vector. The word embedding system may include a set of previously-trained word embeddings (e.g., numerical values) for a given word in connection with various items of contextual data. For example, a single word or other token may multiple word embeddings available, and the word embedding selected at any given time may depend upon the context data associated with the word (e.g., different ASR confidence scores, NLU labels, other contextual data, or combinations thereof).

At block 314, an NLU system generates NLU results based on the word embedding results in order to determine the meaning or intent of the utterance. The NLU system may process word embedding values in order to generate a representation of the utterance. The NLU system may take the word embedding results and other data, such as ASR results, and attempt to make a semantic interpretation of the utterance based at least partly on the word embedding result. The NLU system may be configured to determine a meaning of text based on individual words or word groupings based on their corresponding, individual word embedding results and then implement that meaning. The NLU system may be configured to determine that the utterance corresponds to a given command, request, etc. In some embodiments, the NLU system may further be configured to parse and tag or annotate text (e.g., for the utterance "Purchase a Bike," tag "Purchase" with a Command tag). The NLU system may also be configured to determine a domain of an utterance in order to narrow the services or functionalities that may be relevant.

At block 316, an applications system generates a response to the utterance of the user based on the NLU results. The applications system may receive the NLU results as a given command or request and the applications system may cause one or more actions to be performed in response to the command or request. The applications system may cause one or more applications to perform one or more actions in response to receiving the command or request. For example, in response to receiving the NLU results, the applications system may cause a speaker to play a certain song. The applications system may further cause an indication to be provided to the user that the one or more actions are being performed.

Figure 4:
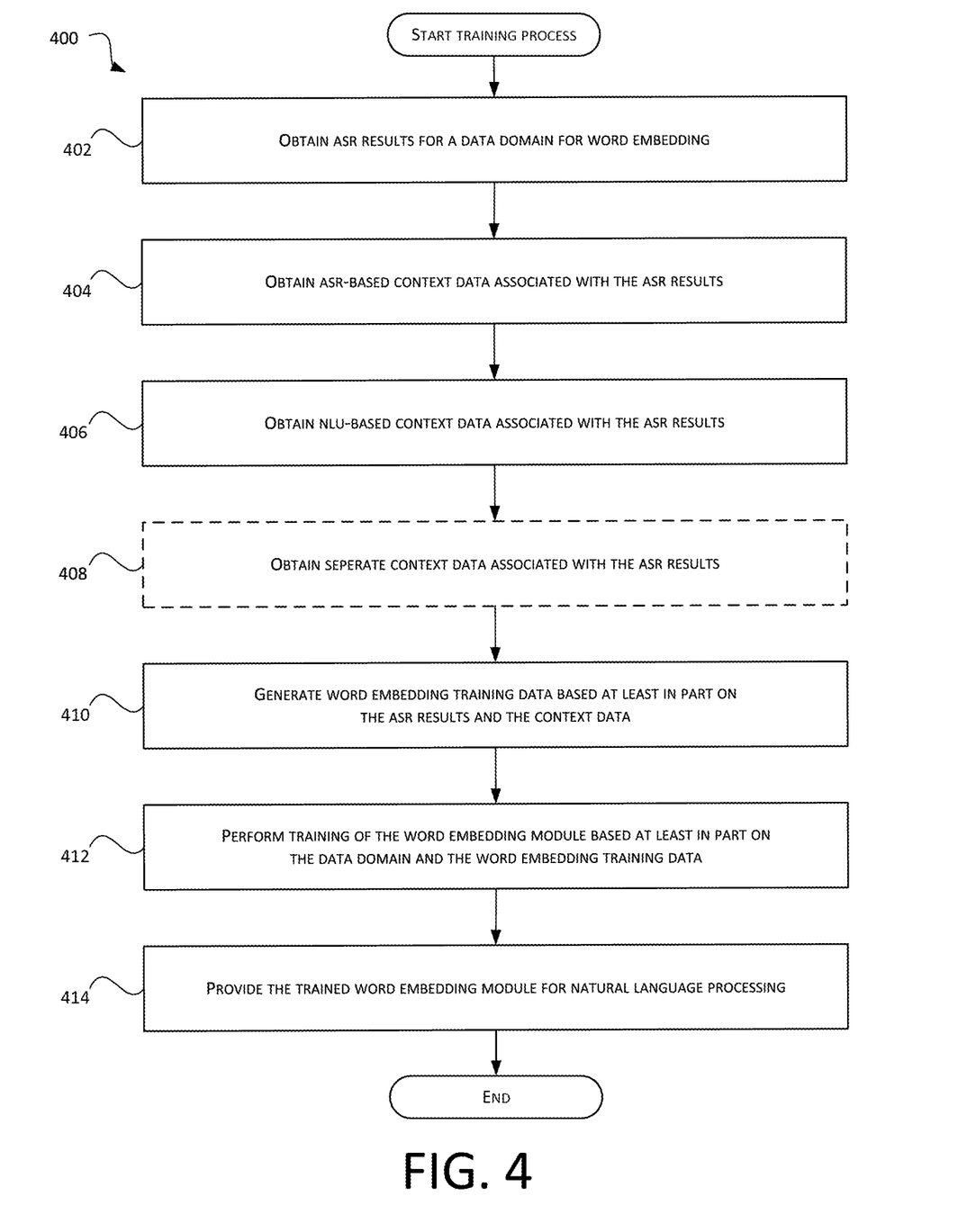
FIG. 4 is a flowchart of an example routine for training a word embedding module using context-augmented input according to some embodiments.

FIG. 4 describes an illustrative process 400 for training a word embedding module. The process 400 includes training a domain-specific word embedding module based on both textual and context data for NLP. By such training, the trained word embedding module is trained to recognize differences in words, differences in word meanings, and other differences based on context data. Advantageously, the trained word embedding module is able to produce word embeddings that provide a higher degree of discrimination between different uses of words in different contexts.

At block 402, ASR data associated with a data domain may be provided to or otherwise accessed by the NLP system for training of a domain-specific word embedding module. The particular data domain may be one of a plurality of available data domains, such as shopping, content presentation, communication, or the like. Utterances processed by the NLP system may be classified into individual data domains such that each data domain may be associated with a set of one or more utterances. For example, a particular data domain may correspond to ASR results generated from shopping utterances (e.g., utterances heard or generated in the shopping context or associated with a shopping service). To train a domain-specific word embedding module, ASR data representing the results of processing utterances in the domain may be accessed. The ASR data that is used to train the domain-specific word embedding module may include words actually generated in ASR results with regards to a given service or category (e.g., complete ASR transcripts or other results of processed utterances) or a corpus of the most commonly observed words with regards to the service or category. For example, in the shopping domain, the words commonly observed in connection with the processing of utterances may include brand names, commands, types of items, etc.

At block 404, ASR context data may, in some embodiments, be provided to or otherwise accessed by the NLP system. The ASR context data may correspond to the ASR data obtained in block 402. In some embodiments, the ASR context data may include a confidence score for each token of a given ASR result. In some embodiments, the ASR data obtained at block 402 may further include the ASR context data corresponding to the generation of the ASR results such that a separate step of accessing ASR context data is not performed.

At block 406, NLU context data may, in some embodiments, be provided to or otherwise accessed by the NLP system. The NLU context data may correspond to the ASR data obtained in block 402. In some embodiments, the NLU context data may include a label or category for each token of a given ASR result.

At block 408, separate context data may, in some embodiments, be provided to or otherwise accessed by the NLP system in order to further provide context data associated with the ASR results. In some embodiments, the separate context data may be or include user context data, such as that described in greater detail herein. The separate context data, the ASR-based context data, and the NLU-based context data may be used individually or in combination to provide context to the tokens provided via the ASR results and to train the word-embedding module. In some embodiments, block 408 may not be included in the process 400 and the NLP system may not receive separate context data for the ASR data. For example, the context data used to train the word embedding module may include only the context data generated by the ASR system at block 404 and the NLU system at block 406. In some embodiments, blocks 404 and/or 406 may not be included in the process 400 and the NLP system may not receive ASR context data and/or NLU context data for the ASR data. For example, the context data used to train the word embedding module may include only separate context data obtained at block 408.

At block 410, the NLP system generates a word embedding training data set based at least in part on the ASR results, the ASR context data, and the NLU context data to train the word embedding module. In some embodiments, the NLP system generates word embedding training data by generating a plurality of input vectors that each include a token (e.g., a word or word grouping of the ASR results for the current data domain) and least one item of context data (e.g., a confidence score, label, user-specific data, other context data, or some combination thereof) for the token. Thus, each input vector of the plurality of input vectors may represent a unique vector of a token in the data domain and its corresponding context data. A word or other token with first context data may correspond to one input vector and the same word or other token with different context data may correspond to a different input vector. Thus, the word embedding training data set may include multiple unique instances of the same word in different contexts (e.g., different combinations of confidence scores, labels, geolocations, etc.).

At block 412, the NLP system trains the word embedding module for a data domain based on the word embedding training data set generated for the data domain. The word embedding module may be trained to obtain word embeddings for the training data input vectors generated above such that the word embedding data output from the word embedding system is based at least in part on the context data associated with the text data in the input vectors. The word embedding output data generated by the trained module may include numerical representations of words based on the training data set input vectors. Illustratively, the word embedding module may be implemented and trained using GloVe models, fastText models, Word2vec models, ELMo models, or other word embedding modelling methods.

In some embodiments, training the word embedding module may include training a machine learning model, such as a neural network, to determine relationships between different words in context. The resulting trained machine learning model may include a set of weights or other parameters, and different subsets of the weights may correspond to different context-augmented input vectors. For example, the weights may be encoded representations of the words in context, and may therefore be saved as the trained word embeddings. In this case, the output of the model (correspondences between words in context) may have been used only for training, and this portion of the machine learning model may not be relevant for use of the word embeddings in natural language processing. In some embodiments, training the word embedding module may include training an autoencoder to encode the context-augmented input vectors into numerical vectors, and then reconstruct the context-augmented input vectors from the encode numerical vectors. The encoded numerical vectors may be saved as the word embeddings for use during natural language processing, or the encoder portion of the autoencoder itself may be used during natural language processing to encode context-augmented input vectors into word embeddings. The decoder portion of the autoencoder (the portion that reconstructs the original context-augmented input vectors) may have been used only for training, and this portion may be removed or otherwise not implemented in the word embedding module for use during natural language processing.

At block 414, the NLP system provides the trained word embedding module for natural language processing. The trained word embedding module may be used to perform word embedding of tokens based on context data associated with the tokens. As described herewith, the trained word embedding system may be used to more accurately predict one or more words with respect to a first word. In some embodiments, the trained word embedding module may be or include a table or listing of word embedding values that correspond to individual combinations of tokens and context data. In some embodiments, the trained word embedding module may include a computational component, such as a neural network, configured to obtain word embedding values that correspond to individual combinations of tokens and context data.

In some embodiments, the process 400 may return to block 402 where a domain-specific word embedding module is generated for a different data domain. For example, a separate domain-specific word embedding module may be trained for each data domain of a plurality of data domains within which the NLP system is configured to operate.

Figure 5:
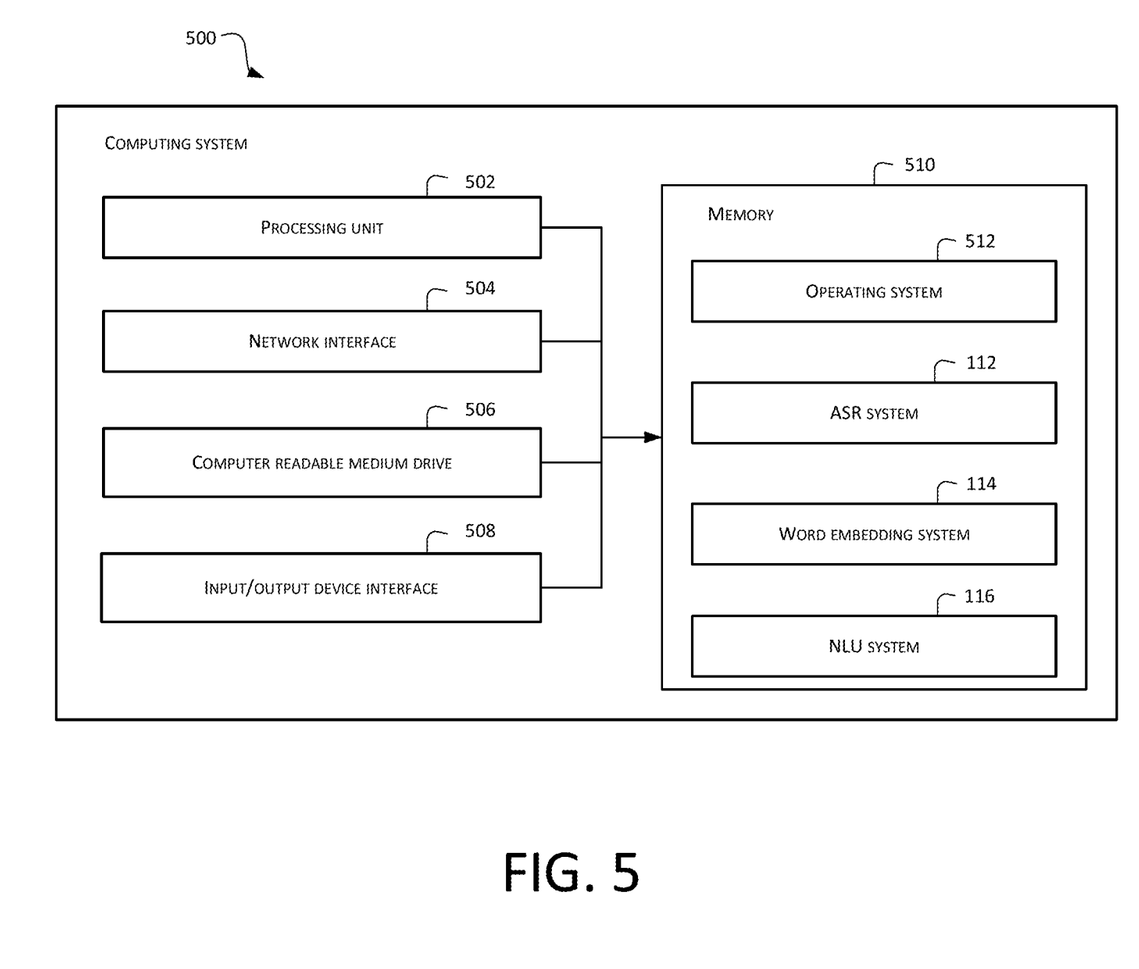
FIG. 5 shows an example computing device that may be used to implement aspects of the present disclosure.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 512 that provides computer program instructions for use by the computer processor 502 in the general administration and operation of the computing system 500. The computer readable memory 510 can further include computer program instructions and other information for implementing aspects of the present disclosure. For example, in one embodiment, the computer readable memory 510 may include an ASR system 112. As another example, the computer-readable memory 510 may include a word embedding system 114. Further, the computer readable memory 510 may include an NLU system 116A, 116B. In some embodiments, multiple computing systems 500 may communicate with each other via their respective network interfaces 504, and can implement speech processing and/or model training separately (e.g., each computing system 500 may execute one or more separate instances of the processes 300 and/or 400), in parallel (e.g., each computing system 500 may execute a portion of a single instance of a process 300 and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors in communication with the computer-readable memory and configured by the executable instructions to at least:
   obtain audio data regarding an utterance of a user;
   generate text data using the audio data, wherein the text data comprises one or more words, each of the one or more words representing a respective portion of the utterance;
   determine a confidence score for a first word of the one or more words based at least in part on generating the text data using the audio data, wherein the confidence score represents a confidence that the first word represents a first portion of the utterance;
   generate a first context data item, wherein the first context data item represents the confidence score of the first word;
   generate a second context data item, wherein the second context data item represents a named entity classification of the first word;
   generate a context-augmented input vector comprising the first context data item and the second context data item appended to the first word;
   obtain a word embedding output vector using the context-augmented input vector, wherein the word embedding output vector represents one or more features associated with the first portion of the utterance;
   generate a semantic representation of the first portion of the utterance based on the text data and the word embedding output vector; and
   execute a command based on the semantic representation.

2. The system of claim 1, wherein the one or more processors are further configured to:
   train a word embedding module on a set of domain-specific training data to generate a trained word embedding, wherein the set of domain-specific training data comprises a plurality of automatic speech recognition results associated with a particular domain;
   wherein the utterance is associated with the particular domain, and wherein the word embedding output vector is generated using the word embedding module.

3. The system of claim 1, wherein the one or more processors are further configured to generate a third context data item, wherein the third context data item represents data corresponding to the user, and wherein the context-augmented input vector further comprises the third context data item appended to the first word.

4. The system of claim 1, wherein the first context data item further represents a bin to which the confidence score is assigned, wherein the bin corresponds to a portion of a range of possible confidence scores for the first word.

5. A computer-implemented method for analyzing data representing natural language input, the computer-implemented method comprising:
   under control of a computing system comprising one or more processors configured to execute specific instructions,
   generating text data comprising a token representing a word of a natural language input;
   generating one or more context data items based at least in part on generating the text data, wherein the one or more context data items are associated with the token and represent at least one of:
      a confidence score representing a confidence that the token represents the word, or
      data corresponding to a user associated with the natural language input;
   generating context-augmented token data representing the one or more context data items and the token based at least in part on appending the at least one of the confidence score or the data corresponding to the user to the token;
   obtaining word embedding data based at least in part on the context-augmented token data; and
   executing a command based at least in part on the word embedding data.

6. The computer-implemented method of claim 5, wherein, the one or more context data items further represent a named entity classification associated with the word.

7. The computer-implemented method of claim 5, wherein generating the one or more context data items comprises generating a first context data item of the one or more context data items representing the confidence score and a second context data item of the one or more context data items representing the data corresponding to the user.

8. The computer-implemented method of claim 7, further comprising assigning the confidence score to a bin of a plurality of bins, wherein each bin of the plurality of bins corresponds to a respective subset of a range of confidence scores.

9. The computer-implemented method of claim 5, wherein generating the one or more context data items comprises generating a context data item of the one or more context data items comprising a label, the label representing one or more classifications associated with the word.

10. The computer-implemented method of claim 9, wherein generating the context data item comprises generating the one or more classifications that classify the word as one or more of: an item name, a brand name, a quantity, an item type, an active user trigger, a shopping service name, or a characteristic.

11. The computer-implemented method of claim 5, further comprising receiving audio data from a user device associated with the user, wherein generating the text data comprises generating the text data using the audio data, and wherein generating the one or more context data items comprises generating a context data item of the one or more context data items representing the data corresponding to the user.

12. The computer-implemented method of claim 11, wherein generating the context data item is based at least in part on one or more of: a geographic location of the user, an age of the user, a gender of the user, an occupation of the user, or a personal interest of the user.

13. The computer-implemented method of claim 5, further comprising receiving audio data from a user device associated with the user, wherein generating the text data comprises performing automatic speech recognition on the audio data to generate a transcription of the natural language input.

14. The computer-implemented method of claim 5, further comprising:
   generating a semantic representation of the natural language input based at least in part on the word embedding data, wherein the semantic representation comprises a user intent and one or more named entities; and
   determining that the semantic representation corresponds to the command, wherein executing the command comprises executing the command in response to determining that the semantic representation corresponds to the command.

15. A system comprising:
computer-readable memory storing a plurality of transcriptions of utterances, wherein individual transcriptions of the plurality of transcriptions are associated with at least one data domain of a plurality of data domains; and
one or more processors in communication with the computer-readable memory and configured by executable instructions to at least:
  obtain a subset of transcriptions of the plurality of transcriptions from the computer-readable memory based at least in part on the subset of transcriptions being associated with a first data domain of the plurality of data domains;
  obtain a plurality of context data sets, wherein individual context data sets of the plurality of context data sets correspond to individual transcriptions of the subset of transcriptions;
  generate a word embedding training set comprising, for each transcription of the subset of transcriptions, one or more context-augmented input vectors, wherein a context-augmented input vector represents a token of a transcription and a context data item associated with the token; and
  train a word embedding system based at least in part on the word embedding training set to generate a trained word embedding system.

16. The system of claim 15, wherein a context data set of the plurality of context data sets comprises automatic speech recognition ("ASR") context data representing at least one of: a confidence score of a token of an utterance, or a label of the token of the utterance.

17. The system of claim 15, wherein a context data set of the plurality of context data sets comprises user context data representing at least one of: a geographic location of a user, a usage history of the user, or a demographic classification of the user.

18. The system of claim 15, wherein the word embedding training set comprises a plurality of context-augmented input vectors associated with a particular token, wherein each of the plurality of context-augmented input vectors comprises a different set of context data associated with the particular token.

19. The system of claim 15, wherein to generate the word embedding training set, the one or more processors are configured to append one or more context data items to a token.

20. The system of claim 15, wherein the one or more processors are further configured by the executable instructions to assign an automatic speech recognition ("ASR") confidence score to a first bin of a plurality of bins, wherein each bin of the plurality of bins corresponds to a different portion of a range of possible confidence scores.

* * * * *